April 5, 1938.  B. G. HERR  2,113,271
CORN FODDER SHOCKER
Filed March 18, 1937  3 Sheets-Sheet 1

Inventor
Benjamin Garrett Herr,
By Minturn & Minturn,
Attorneys

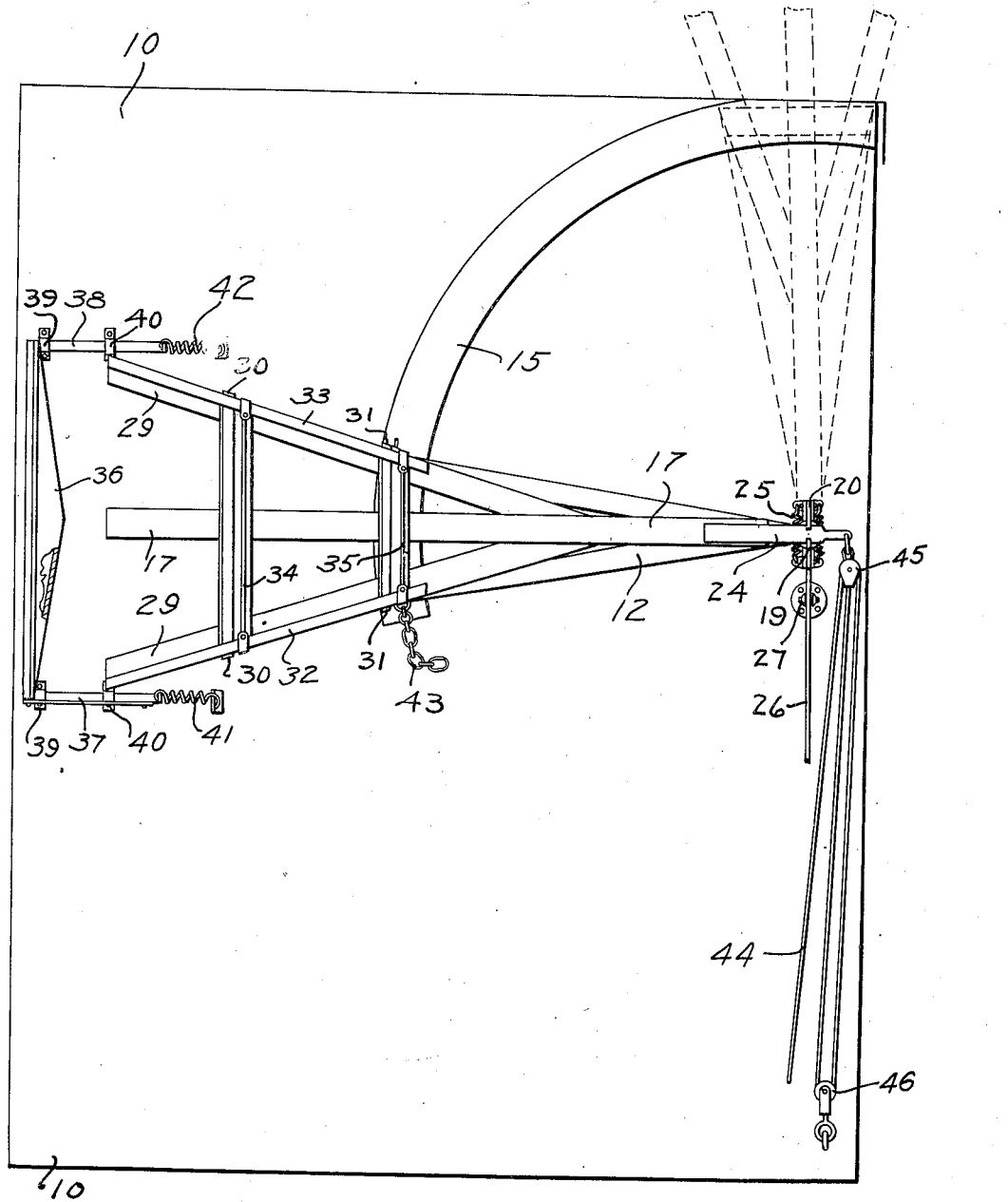

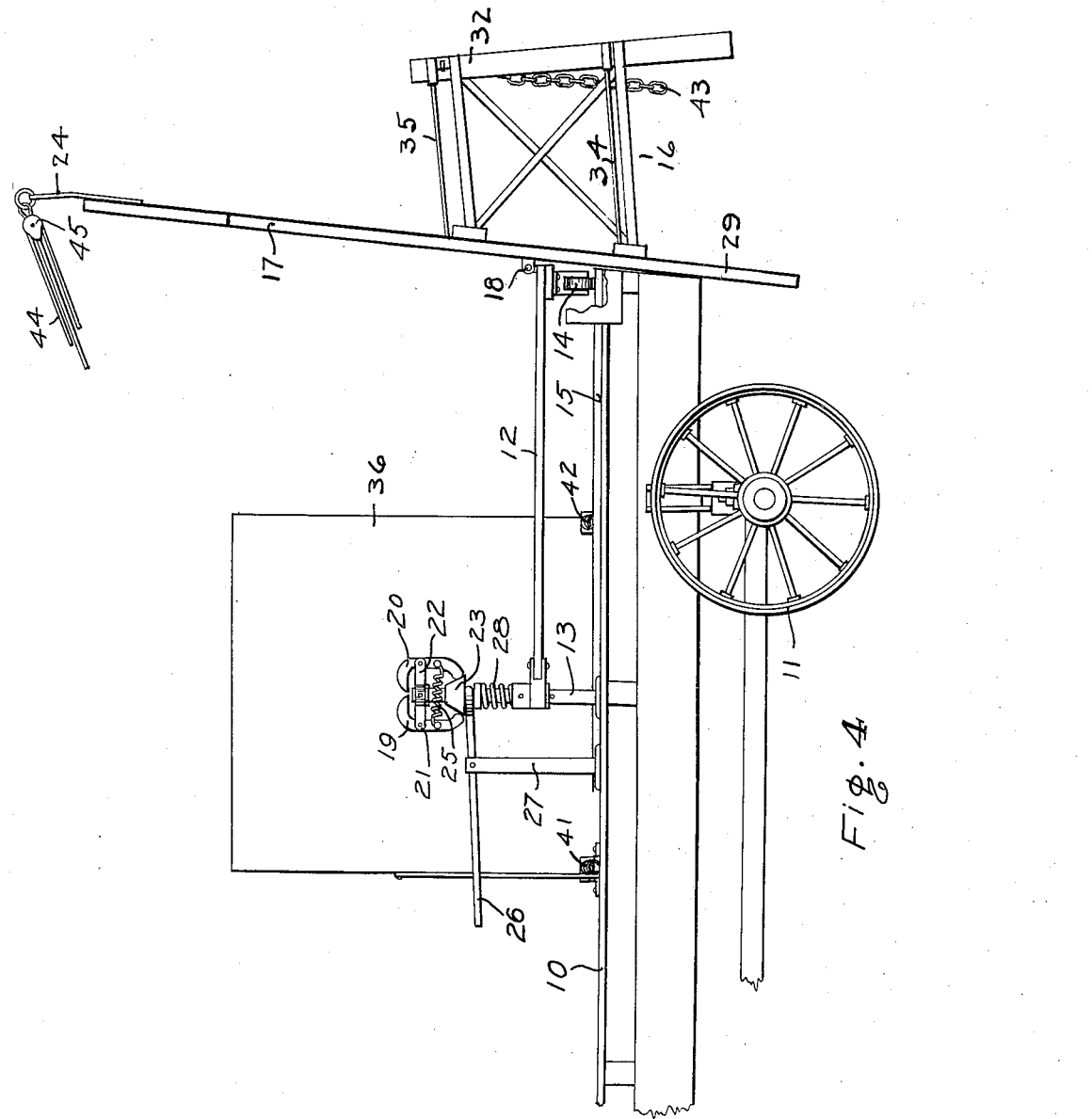

Patented Apr. 5, 1938

2,113,271

UNITED STATES PATENT OFFICE 2,113,271

CORN FODDER SHOCKER

Benjamin Garrett Herr, Indianapolis, Ind.

Application March 18, 1937, Serial No. 131,680

12 Claims. (Cl. 56—401)

This invention relates to means for forming and setting up shocks of corn in the field and has for a primary object the provision of means for forming the shock to have a properly shaped base as will cause the shock to stand erect in the field when subjected to the elements over a period of time, without creeling or falling over.

A still further primary object of the invention is to permit shocking of corn fodder as it may be cut by a corn binder without having to let the cut fodder lay on the field or have to be handled by men walking over the field, picking up individual bundles, carrying them to the shocks and setting them up, but instead permitting the shocking to be done with a minimum of labor with the operator or operators riding along on some platform or vehicle with the corn cutter or binder. The invention is preferably adapted to be employed in conjunction with the customary corn binder which cuts the corn and binds it into small bundles and delivers it to one side by means of an elevator. The invention may be embodied in a separate truck to be drawn along the side of the corn binder to receive the discharge of the elevator or the invention may be incorporated in an attachment to be applied directly to the corn binder, in either event the invention operating in the same manner.

Other particular features of the invention reside in the extreme simplicity and ease of operating the mechanism together with the relatively low initial cost of production, permitting the invention to be employed by farmers without adding much to their usual heavy overhead investment in other machinery.

Figure 1:
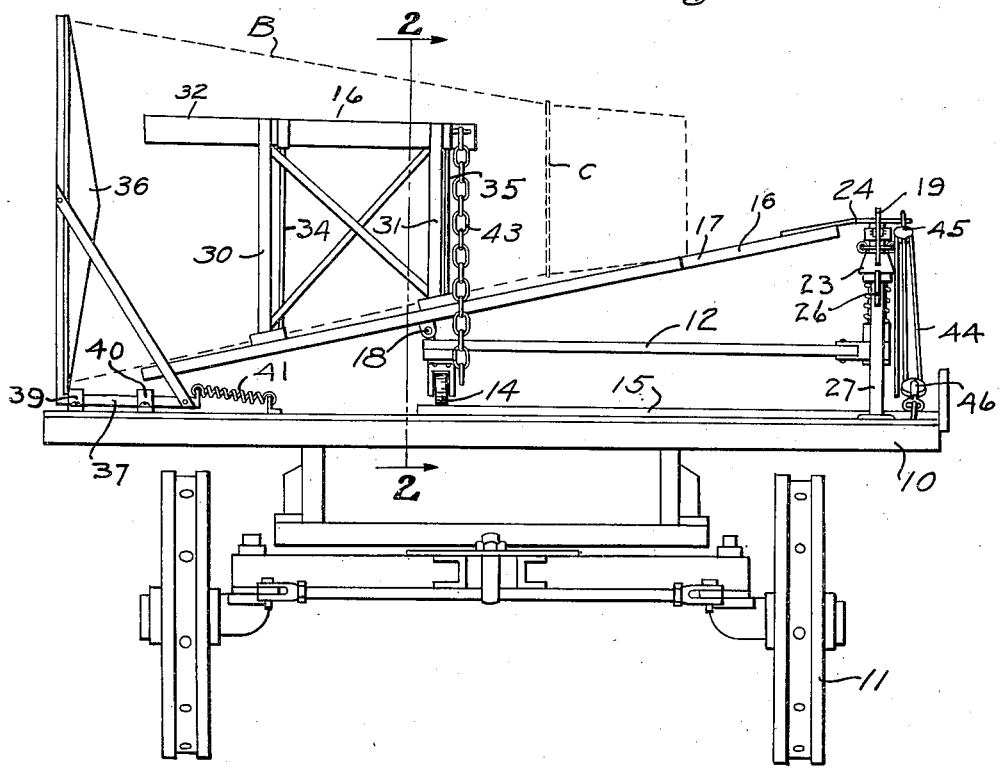
Figure 2:
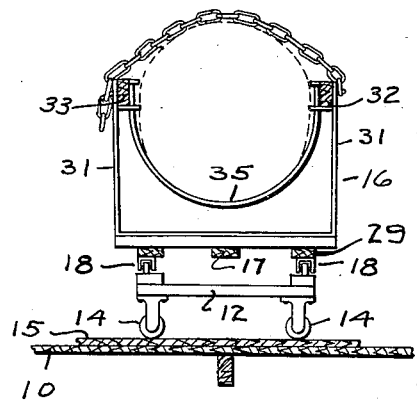

These and other objects and advantages of the invention will become apparent to those versed in the art in the following description of one particular form of the invention as illustrated more or less diagrammatically in the accompanying drawings, in which Fig. 1 is a front elevation of a structure embodying the invention;

Fig. 2, a vertical longitudinal section on the line 2—2 in Fig. 1;

Fig. 3, a top plan view; and

Fig. 4, a side elevation with the structure shown in the unloading position.

Like characters of reference indicate like parts throughout the several views in the drawings.

Any suitable platform, 10 is employed, here shown as being mounted on a truck 11. On this foundation 10 is mounted a frame 12 to have an outer end thereof revolubly carried by an upright post 13 and its inner end supported by one or more casters 14, here shown as two in number. Thus the frame 12 may be swung around over the platform 10 to have the casters 14 follow an arc, the center of curvature of which is in the post 13. For freedom of movement, the casters 14 are preferably carried over an arcuate track 15.

On the inner end of the frame 12 above the casters 14 is pivoted a cradle, generally designated by the numeral 16. This cradle 16 has an arm 17 extending outwardly to rock into engagement with some suitable latch mechanism carried on the upper end of the post 13 whereby, as the frame 12 may be swung about the post 13, the cradle through its pivoted connections 18 with the frame 12 will be carried bodily around with the frame and will also be held in a fixed relation thereto without any vertical swinging movement. In the present form, this latch mechanism is shown as a pair of fingers 19 and 20, Fig. 4, which are supported rockably by the post 13 at its upper end by the arms 21 and 22 carried in a revoluble manner by the post. The lower ends of the fingers 19 and 20 extend downwardly into the path of an upwardly turned conical member 23 whereby this member 23 may be raised to spread the lower ends of these fingers and thereby rock the upper ends toward each other over the end of the tongue 17, this end in the present instance being shown as a bar of metal 24. A spring 25 is interconnected by its ends with the respective fingers 19 and 20 below the arms 21 and 22 so that as the member 23 may be retracted from between the fingers, the spring 25 will cause the fingers to open up and release the bar 24. Any suitable operating means may be employed for effecting this movement of the conical member 23, one such means being a lever 26 mounted on an adjacent post 27 to have an end engaging under the member 23 as a means of lowering the member and with a spring 28 below the member 23 as a means for normally maintaining the conical member 23 in the upper, latch-closed position. Since the cradle revolves with the frame 12, the latch mechanism is likewise revoluble on the post 13 to permit the bar 24 to turn through the desired arc.

This cradle 16 has essentially an A-shaped base through which the arm centrally extends, Fig. 3. From each side of this base, generally designated by the numeral 29, extend uprights 30 and 31 on each side to carry top bars 32 and 33 on the two sides in substantial vertical parallelism with the side members of the base 29, the ends of these members 32 and 33 furthest removed from the pivot post 13 being lifted or spaced further above the base 29 than the opposite ends.

As a means for shaping the shock, there are supported between the members 32 and 33 a number of rod-like members 34 and 35 each being substantially semi-circular in shape, the member 34 being nearer the outer end of the cradle and therefore having a larger radius of curvature than the member 35.

On the platform 10, I mount a base forming member 36 to extend vertically upwardly from the platform 10 to be removed outwardly a slight distance from the outer end of the cradle 16 when the cradle is turned to the transverse position across the platform as indicated in Fig. 3. The area of the member 36 is made to be such as to equal or exceed the base of a cone which would include the curvatures of the two members 34 and 35. In the form herein shown, this member 36 is rectangular in shape and is mounted on a pair of feet 37 and 38, Fig. 3, in such manner that the member 36 may be retractible outwardly from the cradle 16. In the form herein shown, these feet 37 and 38 extend slidably through brackets 39 and 40 and have the springs 41 and 42 normally pulling the feet inwardly toward the cradle to a limiting position as determined by the outer brackets 39. The important feature in this regard is that the member 36 be yieldingly extensible as will hereinafter more fully be explained.

An important feature of the member 36 is that it be shaped to have its center carried inwardly toward the cradle in reference to the outer portions of the member. A practical form is to shape the member 36 more or less conical to have the axis of the cone of the member 36 coincide with the axis of the cone as would be determined by the members 34 and 35.

In operating the invention, the corn fodder is placed upon the platform 10 preferably forwardly of the cradle 16 and in bundles. Of course the fodder may be delivered from a corn binder elevator (not shown) in the usual and well known manner to have the corn fodder delivered over the platform 10 directly above the cradle 16 when in the transverse position across the platform. In any event the corn fodder is placed in the cradle to rest on the members 34 and 35 and to have the butt ends carried against the base forming member 36. Sufficient amount of fodder is placed on the cradle to completely fill the cradle and carry the fodder somewhat above to some such line as indicated by the line B, Fig. 1. This height should be sufficient so that the area of the butt ends of the fodder abutting the member 36 will be roughly outlined by a circle. The fodder is then tied in any suitable manner toward the upper ends of the fodder such as is indicated by the line C, Fig. 1. Then the tied fodder, hereinafter termed a shock, is secured in the cradle by throwing the chain 43 over the top of the shock and pulling it down to have the chain secured to the member 33.

The cradle is then pushed around to extend over the rear end of the platform 10 to the position as indicated by the dash lines in Fig. 3 whereupon the tongue 17 is released from its engagement with the fingers 19 and 20 by pulling up on the lever 26. Since the heavy end of the shock is beyond the pivot connections 18, the shock will tend to rock by its own weight over the end of the platform toward a vertical position carrying the cradle therewith. This movement is retarded by any suitable means such as by holding down on the tongue 17. Since the fodder has considerable weight, it is advisable to provide some mechanical means, here shown as a cable 44 exending through the pulleys 45 on the end of the tongue and 46 anchored to the platform 10 near its front end. By holding the free end of the cable 44, the tongue may be allowed to lift gradually to the upright position as indicated in Fig. 4.

When the cradle has been permitted to travel to the position as indicated in Fig. 4, the chain 43 is released to allow the shock to drop the remaining few inches to the ground so as to set the shock firmly on the ground in an upright position. Since the under side of the shock has been formed to have a concave base, the outer peripheral stalks of the shock will be firmly brought into contact with the ground entirely around the shock and firmly positioned by means of the weight of the interior of the shock tending to drop to the ground and carry those outer stalks down into the soil. It is therefore to be seen that by this particular formation of the base of the shock, a very secure brace in the shock is secured against the effects of wind and softening of the ground.

The platform 10 is then moved ahead and the cradle rocked back over the frame 12 to have the tongue member 24 be reengaged under the upper ends of the fingers 19 and 20 and the cradle is then pulled around to the transverse position ready for reloading for the next shock. Since the shock is formed initially to have the various stalk members in abutment with the member 36, and since the cradle revolves about an arc, to permit the turning of the cradle to the unloading position, it is necessary that the member 36 be permitted to move outwardly in order to clear the forwardly disposed stalks in the shock. This movement is automatcally accomplished by the structure above described wherein the springs 41 and 42 permit the stalks to position the member 36 back out of the way as they are swung to the unloading position. The springs of course return the member 36 back to its normal position.

While I have herein shown and described the invention in the one best form as now known to me, it is possible to employ structural variations without departing from the spirit of the invention and I, therefore, do not desire to be limited to that precise form beyond the limitations as may be imposed by the following claims.

I claim:

1. In a device for shocking fodder, a cradle crosswise of the device to receive the fodder with stalks transversely of the direction of travel of this device, a shock base-shaping member across one end of the cradle, and means for swinging the cradle to extend over the rear end of the device for placing the shock formed in the cradle in an upright position on the ground at the rear end of the device by gravity, said member being formed to produce a concave shock base whereby the ends of the peripheral stalks of the fodder initially project beyond the centermost.

2. A fodder shocking device comprising a baseforming member, the center of which is raised above outer portions thereof; and a cradle crosswise of the direction of travel of the device to receive the fodder in abutment with said member and then to be swung parallel with the direction of the travel of the device for discharge of the fodder.

3. A fodder shocking device comprising a baseforming member, the center of which is raised above outer portions thereof; and a cradle to receive the fodder in abutment with said member; said base-forming member being vertically disposed; and means comprising a pivoted frame shiftably carrying said cradle to permit it to be swung laterally of and away from said member for unloading.

4. A fodder shocking device comprising a cradle for receiving fodder to shape it into a shock, a shock conical-base forming member against which the fodder in said cradle is abutted, and spring means yieldingly influencing the member toward the cradle, but permitting relative movement of said member from said cradle upon shifting of the cradle carried shock.

5. A fodder shocking device comprising a cradle for receiving fodder to shape it into a shock, a shock conical-base forming member against which the fodder in said cradle is abutted, and spring means yieldingly influencing the member toward the cradle, but permitting relative movement of said member from said cradle upon shifting of the cradle carried shock; cradle carrying means comprising a pivoted frame for shifting the cradle; said cradle being hinged to said carrying means whereby the cradle may be rocked to carry said shock to a vertical position for deposit on its base on the ground by gravity.

6. In a device for shocking fodder, a cradle to receive the fodder, a shock base-shaping member across one end of the cradle, and means for placing the shock formed in the cradle in an upright position on the ground, said member being formed to produce a concave shock base whereby the ends of the peripheral stalks of the fodder initially project beyond the centermost, said base-shaping member being vertically disposed at one side of the device and said cradle being formed to receive the fodder substantially thereacross to abut said member by the butt ends and pivoted to swing horizontally and then downwardly to dump the shock off the rear end of the device.

7. A fodder shocking device comprising a foundation, a frame shiftable horizontally over the foundation; a cradle hinged to said frame to swing vertically; and a shock base-shaping member extending upwardly from one side of said foundation, toward which member an open end of the cradle may be directed; said frame being so mounted as to permit it to carry the cradle to one end of the foundation and permit the cradle to rock on its hinge from the horizontal to substantially a vertical position for unloading by gravity.

8. A fodder shocking device comprising a foundation, a frame shiftable horizontally over the foundation; a cradle hinged to said frame to swing vertically; and a shock base-shaping member extending upwardly from one side of said foundation, toward which member an open end of the cradle may be directed; said frame being so mounted as to permit it to carry the cradle to one end of the foundation and permit the cradle to rock on its hinge from the horizontal to substantially a vertical position for unloading by gravity; and means normally, releasably retaining said cradle in a loading position.

9. A fodder shocking device comprising a foundation, a frame shiftable horizontally over the foundation; a cradle hinged to said frame to swing vertically; and a shock base-shaping member extending upwardly from one side of said foundation, toward which member an open end of the cradle may be directed; said frame being so mounted as to permit it to carry the cradle to one end of the foundation and permit the cradle to rock on its hinge from the horizontal to substantially a vertical position for unloading by gravity; said base-forming member having its center projecting farther toward the cradle than outer portions thereof so as to form substantially a concave base in the shock; and means permitting said member to shift as said cradle is moved therepast carrying a shock.

10. A fodder shocking device comprising a foundation, a frame shiftable horizontally over the foundation; a cradle hinged to said frame to swing vertically; and a shock base-shaping member extending upwardly from one side of said foundation, toward which member an open end of the cradle may be directed; said frame being so mounted as to permit it to carry the cradle to one end of the foundation and permit the cradle to rock on its hinge from the horizontal to substantially a vertical position for unloading by gravity; said base-forming member having its center projecting farther toward the cradle than outer portions thereof so as to form substantially a concave base in the shock; and resilient means permitting said member to shift as said cradle is moved therepast carrying a shock, said member and said cradle being arranged and the cradle so carried by said frame as to have the base of the shock carried by the cradle initially a few inches above the ground when the cradle rocks to its vertical position whereby the shock must be dropped to allow it to strike the ground by the outer ring of stalks of fodder therein which thereby initially carry the shock weight.

11. Those steps in a method of forming a fodder shock which consists of forming a concave base in the shock in a horizontal position of the shock, swinging the shock out of contact with the base forming means and then raising the shock to a vertical position and setting the shock by said base on the ground by gravity whereby the shock weight is initially supported by the stalks in the peripheral zone of the shock.

12. That method of forming a fodder horizontal shock which consists of placing the fodder stalks into shock formation; shaping the shock base to be concave; tying the fodder stalks to form a compacted shock; swinging the shock out of contact with the base forming means and sharply setting the shock by its base on the ground by gravity by dropping it; whereby the stalks in the peripheral zone of the shock initially bear on the ground and support the shock weight.

BENJAMIN GARRETT HERR.